United States Patent
Goosey, Jr.

[11] Patent Number: 5,999,330
[45] Date of Patent: Dec. 7, 1999

[54] ZOOM LENS

[75] Inventor: William T. Goosey, Jr., Fairport, N.Y.

[73] Assignee: Eastman Kodak Company, Rochester, N.Y.

[21] Appl. No.: 09/204,847

[22] Filed: Dec. 3, 1998

[51] Int. Cl.$^6$ .............................. G02B 15/14; G02B 3/02; G02B 9/00

[52] U.S. Cl. .......................... 359/689; 359/716; 359/740; 359/791

[58] Field of Search ................................... 359/689, 716, 359/740, 791

[56] References Cited

U.S. PATENT DOCUMENTS

| | | | |
|---|---|---|---|
| 4,726,668 | 2/1988 | Nakayama et al. | 359/692 |
| 5,216,547 | 6/1993 | Ogata | 359/689 |
| 5,325,235 | 6/1994 | Takashima et al. | 359/689 |
| 5,353,159 | 10/1994 | Morooka | 359/689 |
| 5,353,160 | 10/1994 | Ogata | 359/689 |
| 5,715,096 | 2/1998 | Meyers | 359/689 |
| 5,726,810 | 3/1998 | Meyers | 359/684 |
| 5,825,556 | 10/1998 | Meyers | 359/690 |
| 5,838,500 | 11/1998 | Ito et al. | 359/689 |
| 5,886,829 | 3/1999 | Goosey, Jr. | 359/689 |

Primary Examiner—Georgia Epps
Assistant Examiner—Evelyn A. Lester
Attorney, Agent, or Firm—Svetlana Z. Short

[57] ABSTRACT

The zoom lens according to the present invention comprises three lens units. More specifically, there is a front lens unit of positive refractive power, a middle lens unit of positive refractive power, and a rear lens unit of negative refractive power. The front lens unit has a positive lens element and a negative lens element airspaced from the positive lens element. During zooming from a wide-angle to a telephoto position, the front and the rear lens units simultaneously move the toward an object side. The middle lens unit also moves toward the object side, but by a shorter net axial distance than the distance traveled by the front and rear lens units. The "net axial distance" refers to the axial distance between one zoom and another zoom position of a lens unit. The lens elements have sufficient optical powers, spacings and radii of curvature to provide for a large zoom ratio ZR and to maintain an overall compactness so that $L_v/f_t<0.9$ and $ZR = f_t/f_w > 2.5$, where $L_v$ is the distance from the front vertex of the zoom lens to the film plane in the telephoto position, $f_t$ is the focal length of the zoom lens in the telephoto position, and $f_w$ is the focal length of the zoom lens in the wide-angle position.

20 Claims, 9 Drawing Sheets

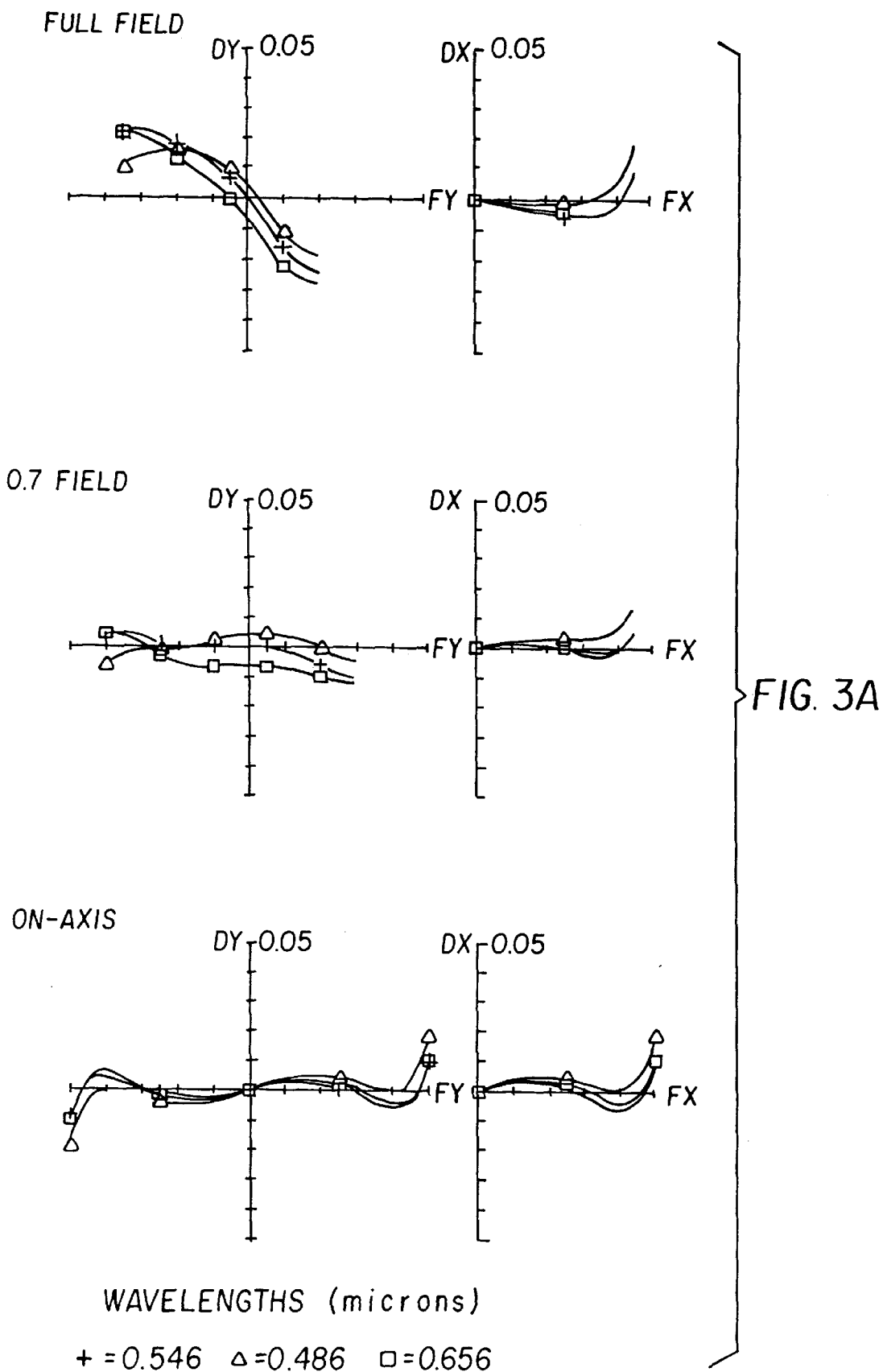

WAVELENGTHS (microns)
+ =0.546  △=0.486  □=0.656

ZOOM LENS

CROSS REFERENCE TO RELATED APPLICATIONS

This application is related to the following commonly assigned application: U.S. Ser. No. 08/901,182, filed Jul. 28, 1998, now U.S. Pat. No. 5,886,829, by William Goosey and entitled COMPACT ZOOM LENS WITH A LARGE ZOOM RATIO.

FIELD OF THE INVENTION

This invention relates to compact zoom lenses which are suited for use as an objective or taking lens in photographic cameras, video cameras, electronic cameras, or the like and, more particularly to zoom lenses with large zoom ratios.

BACKGROUND OF THE INVENTION

Zoom lenses generally are formed of a plurality of groups (also referred to as units) of one or more lens elements. It has been known to make three-unit zoom lenses with a positive front lens unit, a positive middle lens unit, and a negative rear lens unit. However, because of the desire to reduce the size, weight and costs of cameras with zoom lenses, efforts are being made to create more compact zoom lenses with a small number of lens elements and a minimum number of independent zooming lens units, while still producing high quality images over a large focal length range.

More specifically, a zoom lens must maintain high image quality in each zoom position and retain a flat field over a range of field angles. In addition, it is desirable to have a minimum front vertex to image distance in the telephoto position. This provides a small package size and decreases the overall zoom lens volume. It is also desirable to have a minimum number of lens elements and a minimal number of separate zooming lens units in order to reduce cost and to decrease mechanical complexity. However, the requirement to produce a compact zoom lens with a minimum number of independently movable zooming lens units and a minimum number of lens elements often conflicts with the requirement to produce high quality images over a large focal length range. This conflict occurs because when (i) the air spaces between lens units are reduced and (ii) the front vertex to the image plane distance is also reduced (provided that the optical power of the lens units does not change), the lens units can not move far enough during zooming. The lack of travel distance, in turn, decreases the zoom ratio. The zoom ratio ZR is measured by the ratio of focal lengths, i.e. $ZR=f_t/f_w$, is the focal length of the zoom lens in the wide-angle mode and $f_t$ is the focal length of the zoom lens in the telephoto position. If the optical power of the lens units increases (without additional lens elements) in order to provide a larger zoom ratio, lens surfaces become stronger, compromising the performance of the zoom lens. In addition, the shorter the focal length of the zoom lens in the wide angle mode, the more difficult it is to control field aberrations such as coma, astigmatism and field curvature. Controlling these aberrations in a zoom lens that has a minimum number of independently movable lens units and provides a zoom ratio of over 2.5x often results in excess of axial color aberration in the wide angle mode and in lateral color aberration in both wide angle and the telephoto modes. These color aberrations can be controlled by additional lens elements, but this further increases the complexity and size of a zoom lens.

Thus, as the optical powers of lens units increase in order to increase the zoom ratio to about 3x, it becomes more difficult to maintain the optical performance of the zoom lens. Because of this, zoom lenses with large zoom ratios require larger numbers of lens elements. This, in turn, increases the cost of the zoom lenses and often makes the zoom lens less compact. As stated above, if the number of lens elements in a zoom lens is reduced, the performance of the zoom lens suffers.

The compactness of the zoom lens can also be measured by the ratio $L_v$ to $f_t$, where $L_v$ is the distance from the front vertex of the zoom lens to the film plane in the telephoto position. The smaller the ratio, the more compact the zoom lens. However, as stated above, the compactness of the zoom lens should not come as a result of reduced zoom ratio or reduced optical performance.

The following U.S. patents all describe zoom lenses which have three lens units of positive, positive and negative optical power, respectfully.

U.S. Pat. No. 5,825,556 and No. 5,726,810 disclose compact zoom lenses. These zoom lenses provide an excellent performance with only 5 lens elements and a minimum amount of independently moving lens units. More specifically, the front and the rear lens units move together for zooming and the middle lens unit moves independently. The compactness ratio $L_v/f_t$, of the zoom lenses disclosed in these patents are about 0.9. The disclosed zoom lenses provide a zoom ratio of 2x.

U.S. Pat. No. 5,715,096 also discloses a compact three-unit zoom lenses. However, during zooming, all lens units move independently of one another-i.e., they move at different rates. These zoom lenses provide a zoom ratio of over 3x (the focal length $f_w$ in the wide angle mode is 29 mm and its focal length $f_t$ in the telephoto mode is 96.5 mm). The compactness ratios $L_v/f_t$, of the zoom lenses disclosed in this patent are about 0.9. However these zoom lenses require more complex driving means than the zoom lenses disclosed in the U.S. Pat. Nos. 5,825,556 and 5,726,810. The disclosed zoom lenses have lateral color aberration. The maximum amount of lateral color is about 0.02, 0.03, 0.02 in a first, second and third embodiment, respectively.

U.S. Pat. No. 4,726,668, issued Feb. 23, 1988, discloses a zoom lens with three lens units of positive, positive and negative optical powers, respectfully. An aperture stop is located within the middle lens unit. The front and the rear lens units move independently of each other while the second unit, which contains an aperture stop, is held stationary during zooming. This zoom lens has six lens elements and the total length from the front vertex of the zoom lens to its rear vertex is 46.95 mm at the telephoto position. At the wide-angle position, the maximum amount of distortion is 5% and the amount of astigmatism is 0.8 millimeters. In the telephoto position, the distortion amount is again about 5% and the maximum astigmatism is greater than 0.8 millimeters. It is desirable to have a zoom lens that has better performance with respect to astigmatism and distortion, fewer lens elements and that is more compact.

U.S. Pat. No. 5,353,160, issued Oct. 4, 1994, discloses a zoom lens which has either four or five lens elements arranged into three movable lens units. The zoom lens has a zoom ratio $ZR=f_{t/f_w}$ of only 2.0, and its compactness ratio $L_v/f_t$ is 0.93.

U.S. Pat. No. 5,325,235, issued Jun. 28, 1994, has relatively few lens elements (four). Its zoom ratio ZR is only 1.6 and its compactness ratio is about 1.0 (for example, it is 0.96 and 1.13 in the embodiments 3 and 5, respectfully). Thus, this zoom lens is even less compact and has an even smaller zoom ratio than the zoom lens described in U.S. Pat. No. 5,353,160.

U.S. Pat. No. 5,353,159, issued Oct. 4, 1994, discloses a zoom lens with three lens units that move during zooming. The zoom lens has a zoom ratio ZR of only 1.87, and a compactness ratio of about 1.01. This zoom lens has 8 or 9 lens elements.

U.S. Pat. No. 5,216,547, issued Jun. 1, 1993, discloses a zoom lens with three lens units that move during zooming. The zoom lens has a zoom ratio ZR of only 1.87, and a compactness ratio of about 0.94. This zoom lens has 7 lens elements.

Other patents also provide a three unit zoom lenses, but they are either substantially less compact than the lens systems of the above described U.S. patents, or have a substantially greater number of lens elements or have a substantially smaller zoom ratio.

SUMMARY OF THE INVENTION

An object of the present invention is to provide a zoom lens which is compact, offers superior optical performance, has a minimum number of independently movable lens units and a relatively large zoom ratio (i.e., a zoom ratio of 2.5 or larger).

The zoom lens according to the present invention comprises three lens units. More specifically, there is a front lens unit of positive refractive power, a middle lens unit of positive refractive power, and a rear lens unit of negative refractive power. The front lens unit has a positive lens element and a negative lens element airspaced from the positive lens element. During zooming from a wide-angle to a telephoto position, the front and the rear lens units simultaneously move the toward an object side. The middle lens unit also moves toward the object side, but by a shorter net axial distance than the distance traveled by the front and rear lens units. The "net axial distance" refers to the axial distance between one zoom position and another zoom position of a given lens unit. The lens elements have sufficient optical powers, spacings and radii of curvature to provide for a large zoom ratio $ZR=f_t/f_w \geq 2.5$ and to maintain an overall compactness so that $L_v/f_t \leq 0.9$, where $L_v$ is the distance from the front vertex of the zoom lens to the film plane in the telephoto position, $f_t$ is the focal length of the zoom lens in the telephoto position and $f_w$ is the focal length of the zoom lens in the wide-angle position.

According to one embodiment of the present invention, the front and the rear lens units are integral so as to be simultaneously movable for zooming at the same speed and direction.

BRIEF DESCRIPTION OF THE DRAWINGS

FIG. 1A is a sectional view of the zoom lens in a wide-angle position. FIG. 1B is a sectional view of the zoom lens in a middle position. FIG. 1C is a sectional view of the zoom lens in a telephoto position;

FIGS. 3A–3F are graphical representations of the aberrations of the zoom lens illustrated in FIGS. 1A–1C;

DETAILED DESCRIPTION OF THE INVENTION

Figure 1A:
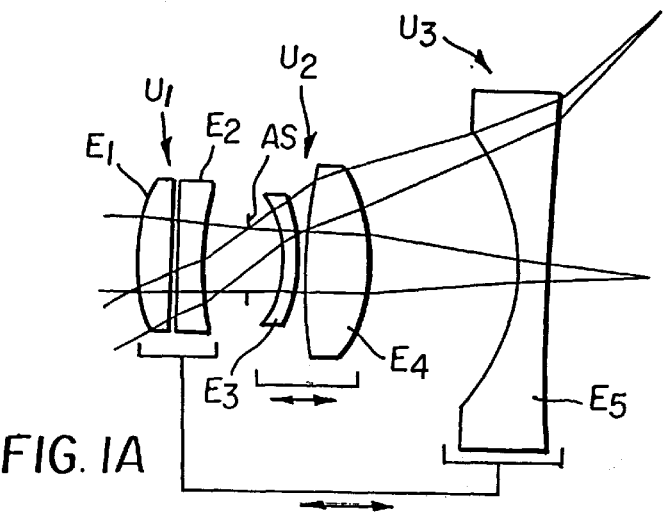
FIGS. 1A–1C show a sectional view of a zoom lens of a first illustrative embodiment.
Figure 1B:
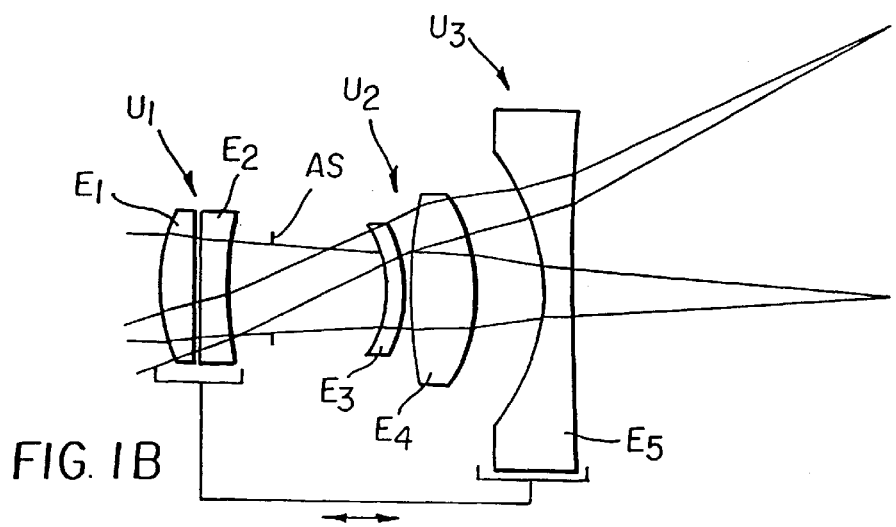
Figure 1C:
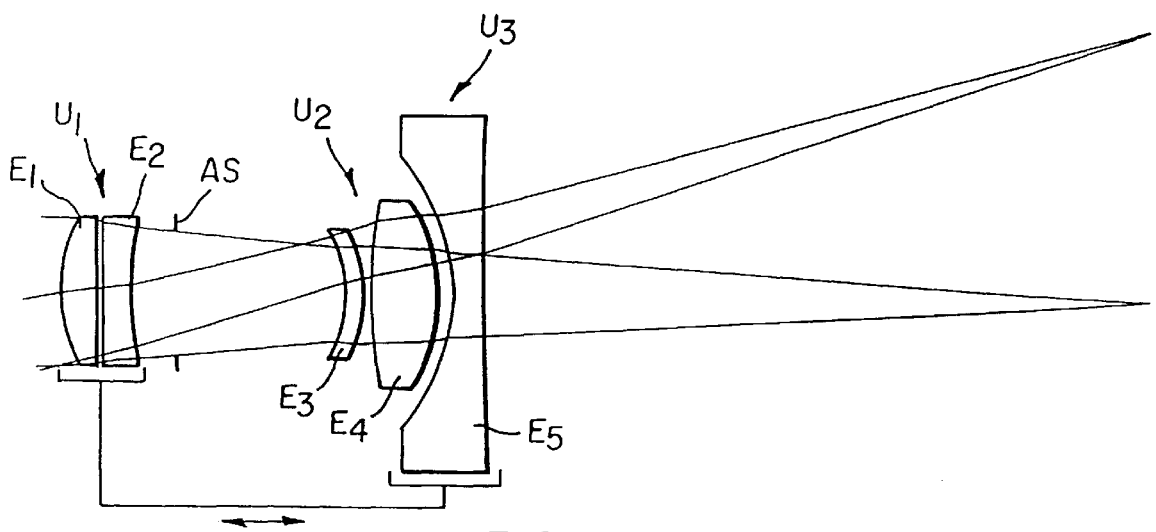

An embodiment of the invention is illustrated in FIGS. 1A–1C and its specific parameters are set fourth in Tables 1A–1C. In the tables and the drawings, the surfaces R are numbered by subscripts from the front or object side of the zoom lens to the rear or image side of the zoom lens. The thickness T of the lens elements, the surface radii R and the spacings S between lens elements are also numbered from front to rear. For example, $S_1$ corresponds to the first air space, $S_2$ to the second air space and $S_3$ to the third air space. In the tables, spaces and thicknesses are listed on the same line as the surface preceding the space or thickness, as the case may be. All indices $N_e$ are for the mercury e line of the spectrum at a wavelength $\lambda_e$ of 546.1 nm. The symbol v stands for the Abbe V-number for the lens material. The thickness and the spacings provided in the tables are in millimeters.

DESCRIPTION OF LENS UNIT CONFIGURATION

Figure 2:
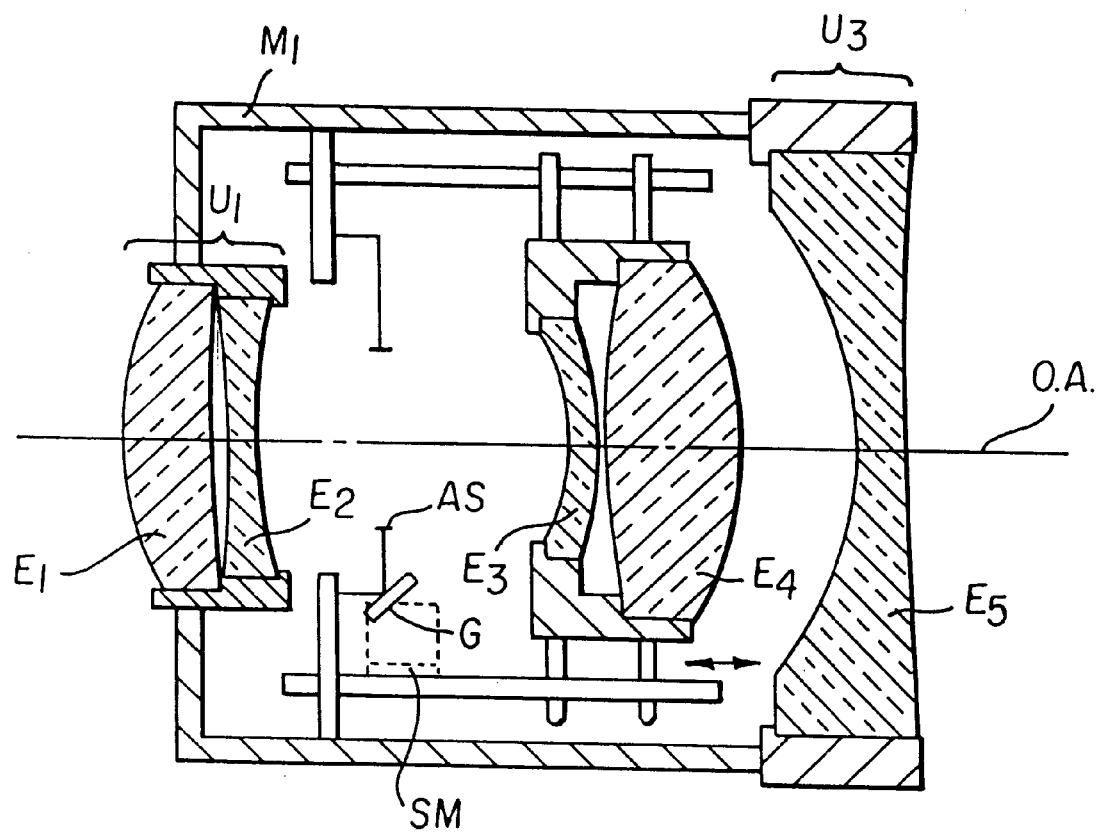
FIG. 2 is a schematic side-sectional view of the zoom lens of FIG 1A and a mount.

Zoom lens 100 (shown in FIGS. 1A–1C) includes 5 lens elements $E_1$–$E_5$ arranged into three axially movable lens units $U_1$, $U_2$ and $U_3$. The lens units $U_1$ and $U_3$ are linked together mechanically and move together during zooming, as shown in FIG. 2. Therefore, the space between these two lens units (i.e. $U_1$ and $U_3$) does not vary for zooming, and thus have the substantial advantage of requiring a much simpler zooming mechanism than those required by typical zoom lens having three independently moving lens units. More specifically, the front lens unit $U_1$ and the rear lens unit $U_3$ move integrally. They are simultaneously movable at the same speed and direction, while the middle lens unit $U_2$ is movable in the same direction at a slower speed. The space between the front lens unit $U_1$ and the middle lens unit $U_2$ widens while the airspace between the middle lens unit $U_2$ and the rear lens unit $U_3$ narrows as the three lens units move toward the object side (along an optical axis) when the zoom lens zooms from a wide-angle position (W) towards a telephoto position (T). Although it is preferred that lens units $U_1$ and $U_3$ move together, this is not necessary. The lens units $U_1$ and $U_3$ can be de-coupled to provide an even larger zoom ratio.

The front lens unit $U_1$ is an achromatized positive power air spaced doublet. It is corrected for primary axial color. The focal length $FL_1$ of the front lens unit $U_1$ of the illustrative embodiment is about 56.1 mm and its power is about $1.789 \times 10^{-2}$. The front lens unit $U_1$ includes a positive power lens element $E_1$ located in front (i.e., towards the object side) and a negative power lens element $E_2$ located behind lens element $E_1$. The use of the air spaced doublet in the front lens unit $U_1$ significantly reduces color aberrations, and especially axial color aberration of the entire zoom lens in a wide angle mode (even if the wide mode focal length is less than 30 mm) without the use of expensive, high V-number glasses. This, in turn, results in improvement in the modulation transfer function (MTF) of the zoom lens.

According to the illustrative embodiment, the middle lens unit $U_2$ is located behind the front lens unit $U_1$. The middle lens unit $U_2$ is also positive (i.e. it has positive power). It contains two very slightly airspaced lens elements (a meniscus lens element $E_3$ and a biconvex lens element $E_4$). The focal length $FL_2$ of the second lens unit $U_2$ of this illustrative embodiment is about 18.6 millimeters and its power is about $5.4 \times 10^{-2}$.

The rear optical unit $U_3$ is substantially negative in power. Its focal length in the first illustrative embodiment is about −16.3 millimeters and its power is about $-6.1 \times 10^{-2}$. The rear optical unit $U_3$ contains a relatively strong negative power lens element $E_5$ with a concave object side surface $S_8$. It is preferred that the absolute value of the ratio of lens unit powers $\phi_3$ to $\phi_2$ is approximately 1.1 to 1.3. In this embodiment it is 1.14. The object side surface $S_9$ of lens element $E_5$ has a smaller radius of curvature then that of the image side surface $S_{10}$. The use of a strong negative lens element $E_5$ in the rear allows for the zoom lens to have a very effective field flattener when the zoom lens is in wide-angle position and provides for a high level of aberration correction in the telephoto position. The compact zoom lens of the present invention also achieves minimization of the front vertex to image plane distance partially via the use of the strong rear lens element $E_5$.

APERTURE STOP

According to the illustrative embodiment (zoom lens 100) the aperture stop AS is in the form of a shutter which is positioned with the front lens unit $U_1$. That is, the shutter moves together with the front lens unit $U_1$. The placement of the aperture stop between the front and the middle lens units $U_1$, $U_2$ reduces the size of the front lens unit $U_1$, which simplifies mounting and reduces the size of the telescoping zoom lens barrel.

As shown in FIG. 2, the mechanical mount for this type of zoom lens is generally constructed with the larger mount $M_1$ connecting the front and rear lens units $U_1$ and $U_3$ and a smaller mount $M_2$ for the middle lens unit $U_2$ which is nested inside the larger lens mount. Having the shutter attached to the front lens unit $U_1$ as shown in the first illustrative embodiment, allows the shutter to be mounted on a larger lens mount $M_1$ which links the front and rear lens units $U_1$ and $U_3$ together. A gearing mechanism G and a stepping motor SM could be used to control the opening size of the shutter.

ASPHERIC SURFACES

It is preferred that the zoom lens has at least two aspheric surfaces. Zoom lens 100 has one aspheric surface in each lens unit. The aspheric equation describing these aspheric surfaces is:

$$X = \frac{CY}{1 + \sqrt{1 - (k+1)C^2Y^2}} + ADY^4 + AEY^6 + AFY^8 + AGY^{10} + AHY^{12} + AIY^{14} + AJY^{16} + AKY^{18}$$

where:

X is the distance along the optical axis OA;

Y is the height from the optical axis;

C is the reciprocal of the vertex radius of curvature of the curved lens surface;

k is the conic constant; and

AD through AK are aspheric coefficients of 4th, 6th, 8th, 10th, 12th, 14th, 16th, and 18th order. The values of the aspheric coefficients for the various aspheric lens surfaces for the lens embodiment are provided in Table 1B.

More specifically, the aspheric surfaces are located on the surfaces with radii $R_1$, $R_8$ and $R_9$ associated with lens elements $E_1$, $E_4$ and $E_5$, respectively. The use of aspheric surfaces provides several advantages. First, it helps to minimize the number of lens elements in the zoom lens.

Secondly, having no more than one aspheric surface per lens unit results in aspheric surfaces being widely separated (in a majority of zoom positions) from one another, which in turn results in low sensitivity of the zoom lens to tilt, decentration, surface figure error (i.e. power irregularity) and thickness errors. Zoom lenses which utilize biaspheric elements tend to be very sensitive to alignment, especially tilt and decentration of one lens surface to the other and to the displacement of a lens element from the optical axis. The low sensitivity of the present lens zoom lens 100 makes it easier and less expensive to manufacture and assemble than a typical zoom lens of comparable performance.

Thirdly, in addition to decreasing the number of lens elements in the zoom lens, aspheric surfaces significantly increase the resultant image quality. The resulting image quality of zoom lens 100 is very high given the relatively small number of elements, the large zoom ratio, and the small number of independently moving zooming lens units.

For example, zoom lens 100 provides a 2.83× zoom ratio and its compactness ratio $L_v/f_t$ ft is 0.88. This zoom lens has a maximum astigmatism of 0.1 mm and only 0.7% distortion in the wide-angle position, while in the telephoto position, the astigmatism is less than 0.25 millimeters, the maximum lateral color is less than 0.03 millimeters and the maximum distortion is only 1.5%. Thus, this zoom lens performs similar to that of the zoom lenses disclosed in U.S. Pat. No. 5,715,096, but zoom lens 100 has only 2 independently moving units and thus, requires simpler driving means.

Figure 3B:
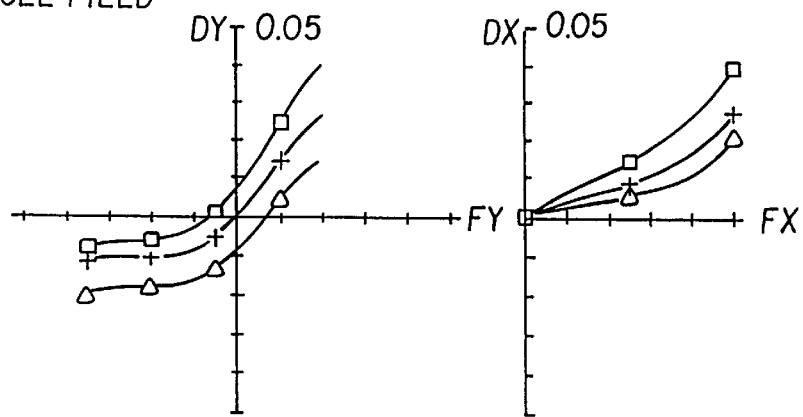
Figure 3B:
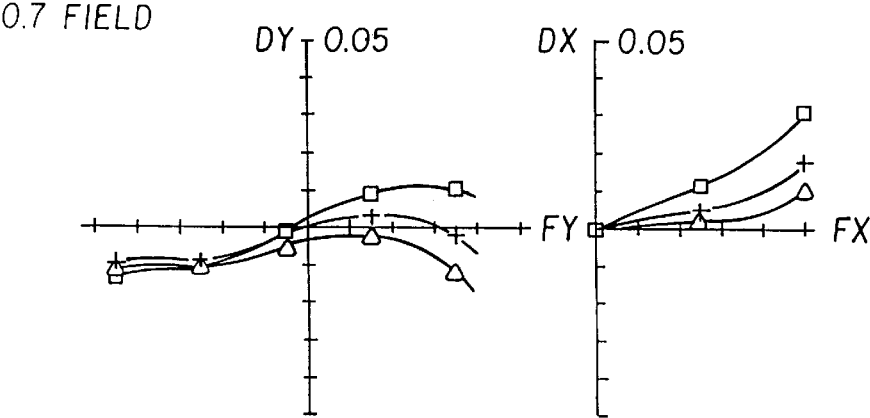
Figure 3B:
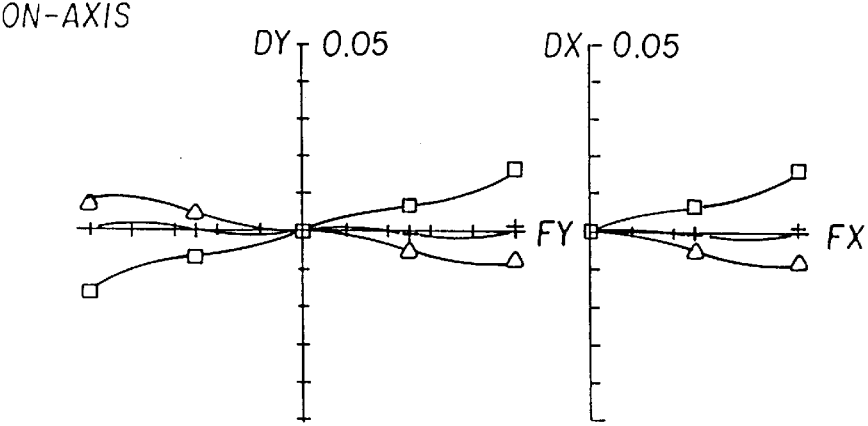
Figure 3C:
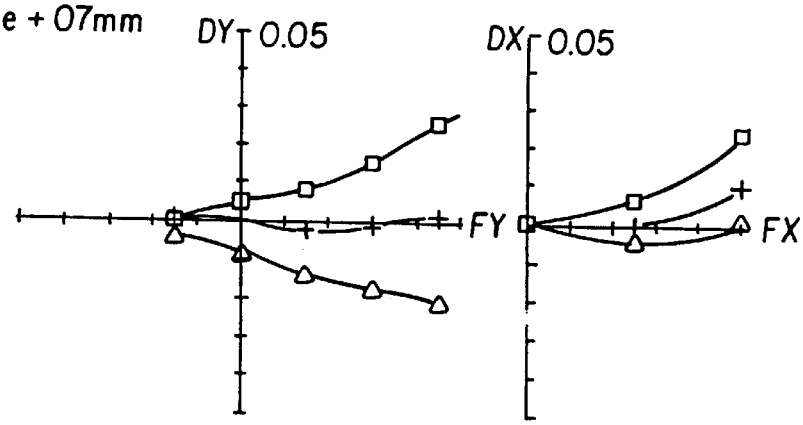
Figure 3C:
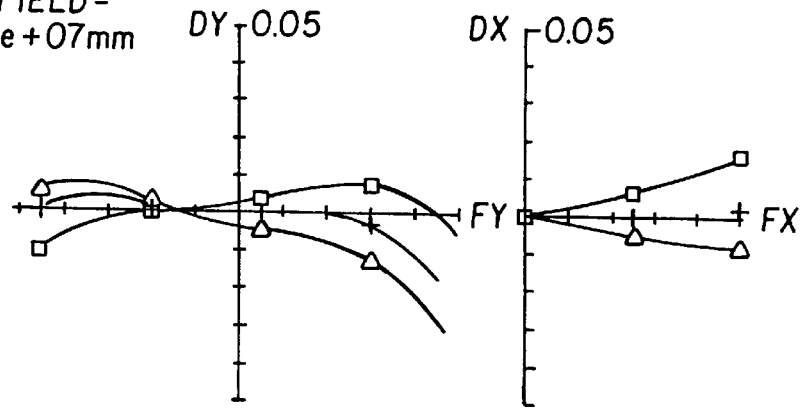
Figure 3C:
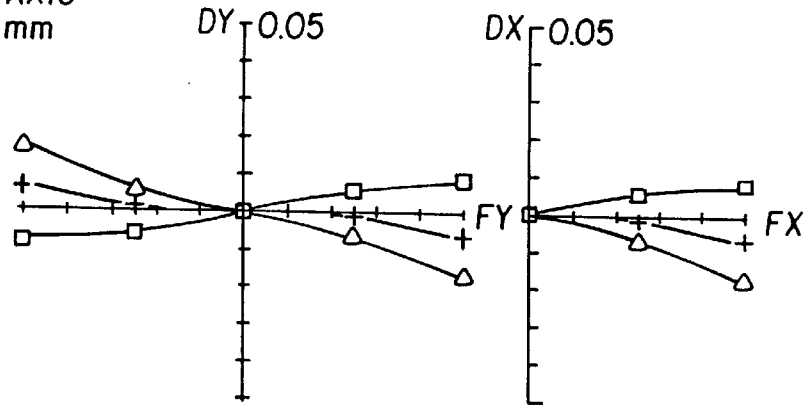
Figure 3D:
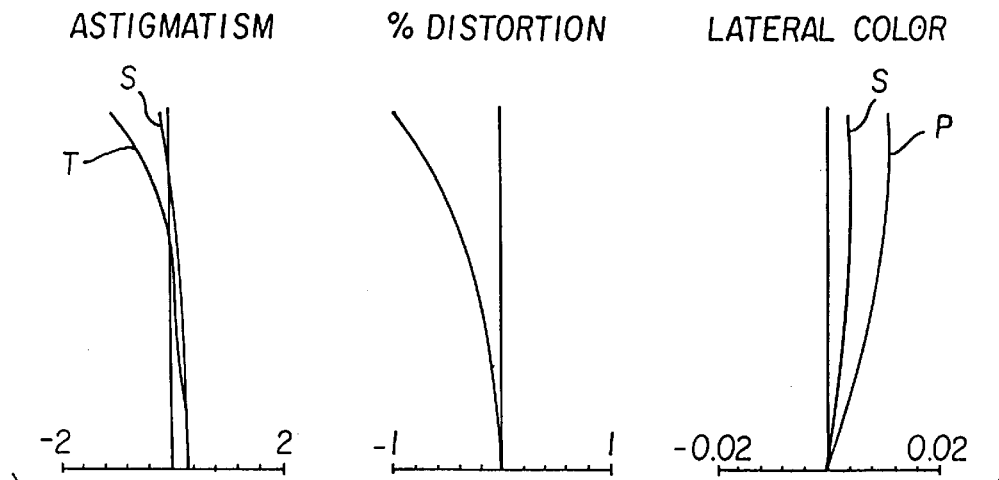
Figure 3E:
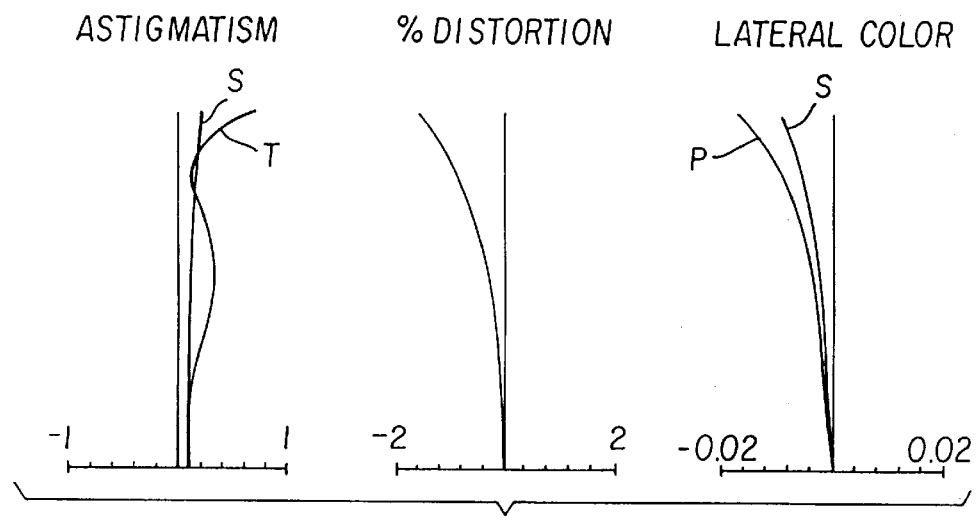
Figure 3F:
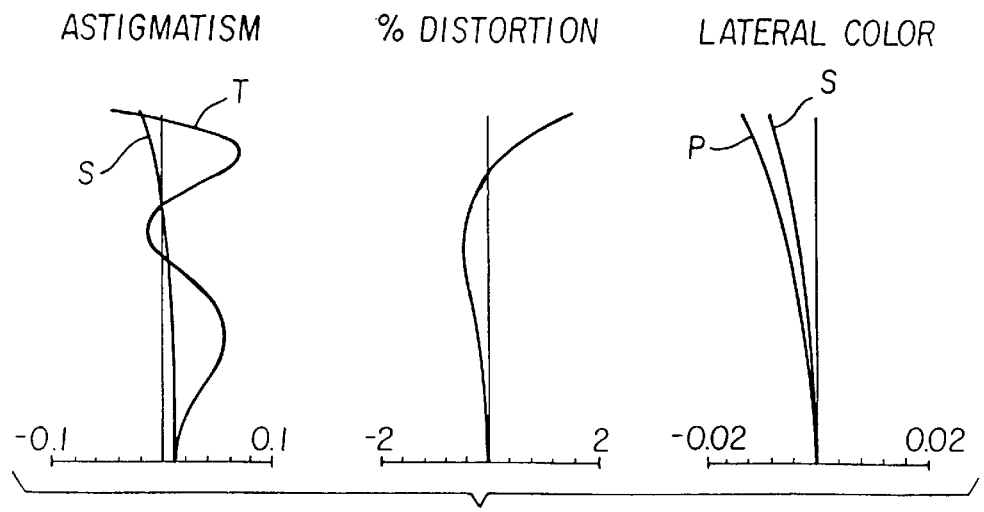
Figure 4A:
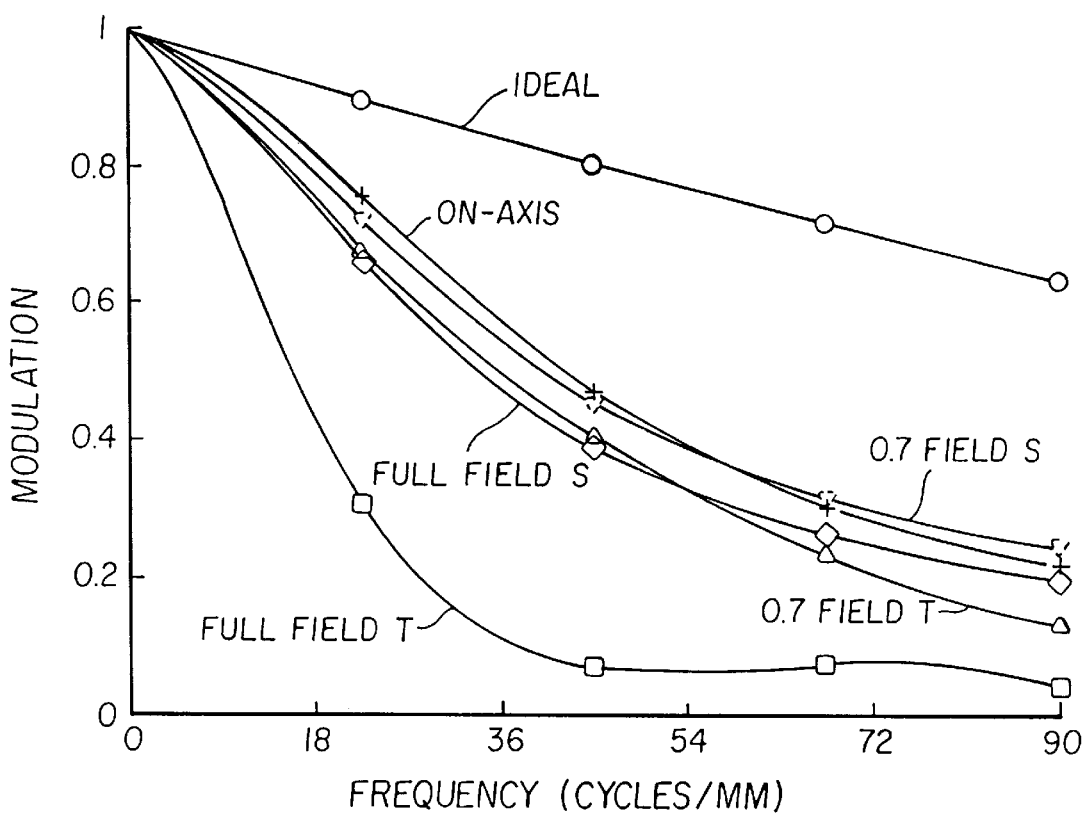
FIGS. 4A–4C are plots of the Modulation Transfer Function (MTF) vs. frequency of the zoom lens in wide-angle, middle, and telephoto positions, respectively.
Figure 4B:
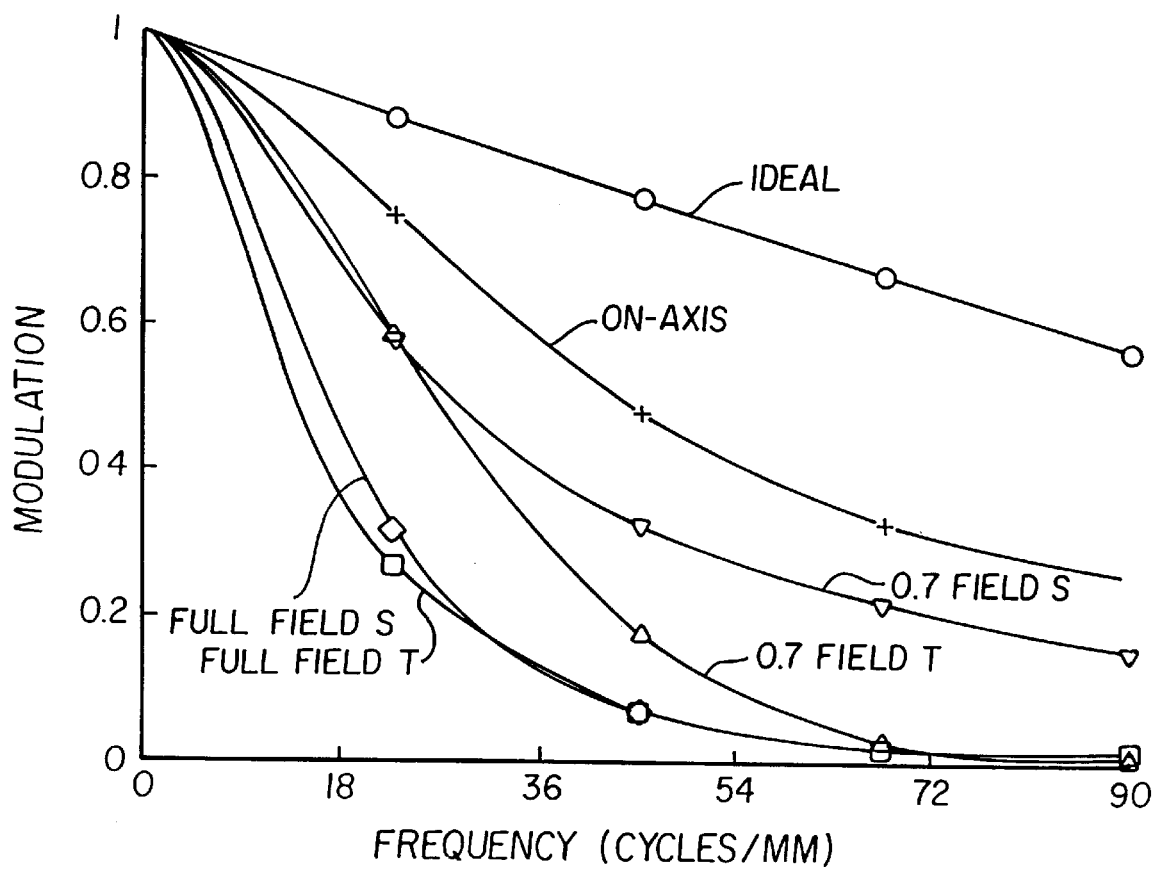
Figure 4C:
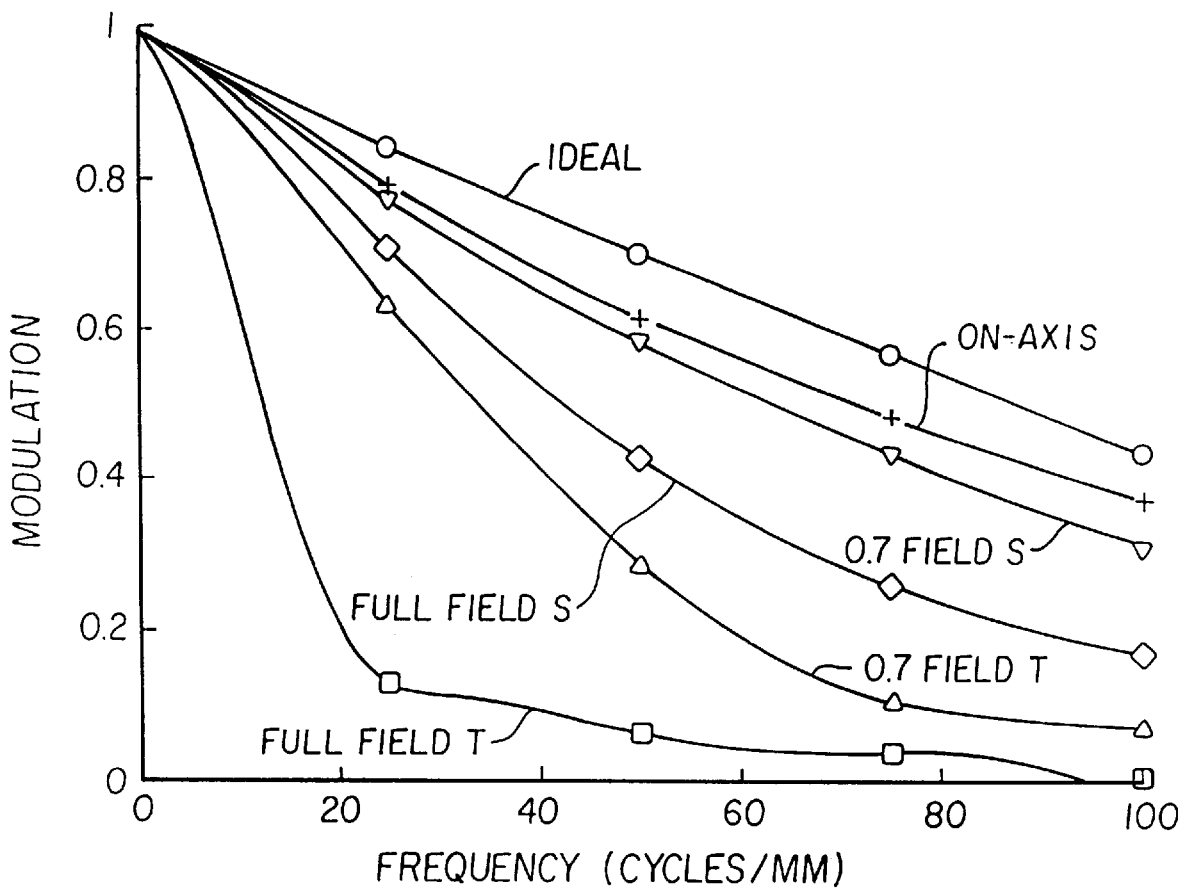

FIGS. 3A–3F and 4A–4C detail the performance of zoom lens 100 at wide-angle, mid-zoom and telephoto positions. Included are ray traces for the various field positions, field curvature, distortion and lateral color plots, and MTF (Modulation Transfer Function) vs. frequency graphs for the wide-angle, mid-zoom and telephoto zoom positions. More specifically, FIG. 3A provides ray intercept plots for lens 100 when it is operating in the telephoto position at 0, 0.7, and full field ($\omega=13°$) of view, respectfully. FIG. 3B provides ray intercept plots for lens 100 when it is operating in the middle position at 0, 0.7, and full field ($\omega=22°$) of view. FIG. 3C provides ray intercept plots for lens 100 when the zoom lens is operating at the wide-angle position ($\omega=33°$). FIGS. 3D–3F represent Astigmatism, Distortion and Lateral Color when the zoom lens is operating in the telephoto, middle and wide-angle position, respectfully. FIGS. 4A–4C are plots of the Modulation Transfer Function (MTF) vs. frequency of the zoom lens in wide-angle, middle, and telephoto positions, respectively.

TABLE 1A

| Surface | Radius | Thickness (T) | $N_e$ | v |
|---|---|---|---|---|
| *$R_1$ | 10.555 | 2.325 | 1.604 | 43.56 |
| $R_2$ | 100.981 | 0.500 | | |
| $R_3$ | −125.137 | 1.000 | 1.792 | 25.67 |
| $R_4$ | 24.2399 | 2.720 | | |
| Aperture Stop | | $S_2$ = Variable | | |
| $R_5$ | −6.7132 | 0.941 | 1.503 | 56.40 |
| $R_6$ | −9.6687 | 0.20 | | |
| $R_7$ | 23.5706 | 4.337 | 1.502 | 56.28 |
| *$R_8$ | −10.1059 | $S_4$ = Variable | | |
| *$R_9$ | −10.2561 | 1.70 | 1.586 | 60.72 |
| $R_{10}$ | 150.74 | $S_5$ = Variable Image Plane | | |

*Asphere

TABLE 1B

| Aspheric Coefficients | Surface | | |
|---|---|---|---|
| | $R_1$ | $R_8$ | $R_9$ |
| AD | $-.33955\ e^{-4}$ | $.11431\ e^{-3}$ | $.12608 e^{-3}$ |
| AE | $-.80185\ e^{-6}$ | $.35324\ e^{-6}$ | $.15966 e^{-5}$ |
| AF | $.26477\ e^{-7}$ | $.14379\ e^{-6}$ | $-.50007 e^{-7}$ |
| AG | $.15907\ e^{-8}$ | $-.89718\ e^{-8}$ | $.73404 e^{-9}$ |
| AH | $-.18228\ e^{-9}$ | $.10087\ e^{-9}$ | $-.1117 e^{-10}$ |
| AI | $.4411\ e^{-11}$ | $.52467 e^{-11}$ | $.53055 e^{-13}$ |
| AJ | $.12874\ e^{-13}$ | $-.16569\ e^{-12}$ | $.12317 e^{-14}$ |
| AK | $-.10756\ e^{-14}$ | $.13787 e^{-14}$ | $-.13001 e^{-16}$ |
| k | 0.4330002 | −0.8711596 | −.632922 |

| Wavelengths (μm) | | |
|---|---|---|
| $\lambda_1$ | $\lambda_2$ | $\lambda_3$ |
| 0.5461 | 0.4861 | 0.6563 | where k is a conic constant.

TABLE 1C

| Zoom Spacing Data | | | | | | |
|---|---|---|---|---|---|---|
| Zoom Position # | $S_2$ | $S_4$ | *$L_v$ | BFL | EFL | F # |
| 1 (wide) | 2.551 | 8.49 | 30.70 | 5.94 | 25.75 | 5.8 |
| 2 | 5.042 | 5.999 | 36.35 | 11.54 | 33.39 | 6.55 |
| 3 | 7.120 | 3.921 | 43.57 | 18.69 | 43.30 | 7.14 |
| 4 | 8.838 | 2.203 | 52.77 | 27.87 | 56.15 | 7.79 |
| 5 (telephoto) | 10.247 | 0.794 | 64.37 | 39.67 | 72.82 | 7.9 |

| STOP Diameter | |
|---|---|
| Zoom Position # | Diameter |
| 1 (wide) | 3.65 |
| 2 | 4.2 |
| 3 | 5.00 |
| 4 | 5.97 |
| 5 (telephoto) | 7.71 |

*$L_v$ is the distance from the front vertex of the lens to its image plane

The invention has been described in detail with particular reference to certain preferred embodiments thereof, but it will be understood that variations and modifications can be effected within the spirit and scope of the invention.

What is claimed is:

1. A zoom lens centered on an optical axis for imaging onto an image plane, said zoom lens comprising a plurality of lens elements arranged along an optical axis in order from an object side into:

a front, positive power lens unit consisting of a positive lens element and a negative lens element airspaced from said positive lens element;

a rear, negative power lens unit located between the front lens unit and the image plane, said rear and said front lens units being simultaneously movable towards the object side during zooming from a wide angle to a telephoto position;

a middle, positive power lens unit located between the front and rear lens units, said middle lens unit having only two lens components and being movable in the same direction as the front and rear lens units and travels a shorter net axial distance than the distance traveled by said front and rear lens units; and the plurality of lens elements of said zoom lens have sufficient optical powers, spacings and radii of curvature to provide for a zoom ratio ZR and to maintain an overall compactness so that $L_v/f_t<0.9$ and $ZR=f_t/f_w>2.5$ where $L_v$ is the distance from the front vertex of the lens zoom lens to image plane in the telephoto position, $f_t$ is the focal length of the zoom lens in the telephoto position, and $f_w$ is the focal length of the zoom lens in the wide-angle position.

2. A zoom lens according to claim 1, wherein said front and said rear lens units move axially at the same speed and direction.

3. A zoom lens according to claim 1 wherein $f_t/f_w \approx 3$.

4. A zoom lens centered on an optical axis for imaging onto an image plane, said zoom lens comprising a plurality of lens elements arranged along an optical axis in order from an object side into:

a front, positive power lens unit consisting of a positive lens element and a negative lens element airspaced from said positive lens element;

a rear, negative power lens unit located between the front lens unit and the image plane, said rear and said front lens units being simultaneously movable towards the object side during zooming from a wide angle to a telephoto position;

a middle, positive power lens unit located between the front and rear lens units, said middle lens unit being movable in the same direction as the front and rear lens units and travels a shorter net axial distance than the distance traveled by said front and rear lens units; and the plurality of lens elements of said zoom lens have sufficient optical powers, spacings and radii of curvature to provide for a zoom ratio ZR and to maintain an overall compactness so that $L_v/f_t<0.9$ and $ZR=f_t/f_w>2.5$ where $L_v$ is the distance from the front vertex of the lens zoom lens to image plane in the telephoto position, $f_t$ is the focal length of the zoom lens in the telephoto position, and $f_w$ is the focal length of the zoom lens in the wide-angle position, wherein $f_w<30$ mm.

5. A zoom lens according to claim 4 wherein said zoom lens has a maximum ½ field of view that is at least 30 degrees.

6. A zoom lens according to claim 5, wherein $f_w \approx 25$ mm.

7. A zoom lens centered on an optical axis for imaging onto an image plane, said zoom lens consisting of five lens elements arranged along an optical axis in order from an object side into a front, positive power lens unit consisting of a positive lens element and a negative lens element airspaced from said positive lens element;

a rear, negative power lens unit located between the front lens unit and the image plane, said rear and said front lens units being simultaneously movable towards the object side during zooming from a wide angle to a telephoto position;

a middle, positive power lens unit located between the front and rear lens units, said middle lens unit being movable in the same direction as the front and rear lens units and travels a shorter net axial distance than the distance traveled by said front and rear lens units; and the said five lens elements of said zoom lens have sufficient optical powers, spacings and radii of curvature to provide for a zoom ratio ZR and to maintain an overall compactness so that $L_v/f_t<0.9$ and $ZR=f_t/f_w>2.5$ where $L_v$ is the distance from the front vertex of the lens zoom lens to image plane in the telephoto position, $f_t$ is the focal length of the zoom lens in the telephoto position, and $f_w$ is the focal length of the zoom lens in the wide-angle position.

8. A zoom lens according to claim 1, wherein said front lens unit is corrected for primary axial color.

9. A zoom lens according to claim 1, having at least two aspheric surfaces.

10. A zoom lens according to claim 1, having at least one aspheric surface in each of said three lens units.

11. A zoom lens centered on an optical axis for imaging onto an image plane, said zoom lens comprising a plurality of lens elements arranged into:

a front, positive power lens unit having a positive power lens element and a negative power lens element airspaced from said positive lens element, said front lens unit being movable toward and away from the image plane along the optical axis;

a rear, negative power lens unit between the front lens unit and the image plane, said rear lens unit being integral with the front lens unit so as to be movable therewith;

a middle, positive power lens unit between the front and rear lens units, said middle lens unit comprising no more than two lens components and being movable in the same direction as the front and rear lens units at a slower speed than that at which the front and rear lens units are moved, the plurality of lens elements have sufficient optical powers, spacings and radii of curvature to provide for a zoom ratio $ZR=f_t/f_w$ greater than 2.5 and to maintain an overall compactness so that $L_v/f_t<0.9$, where $L_v$ is the distance from the front vertex of the zoom lens to the film plane in the telephoto position and $f_t$ is the focal length of the zoom lens in the telephoto position and $f_w$ is the focal length of the zoom lens in the wide-angle position.

12. A zoom lens according to claim 11, wherein said positive lens element of said front lens unit is a frontmost lens element.

13. A zoom lens according to claim 12, wherein:

said lens elements of said front lens unit are a positive power lens element with a convex surface oriented towards an object side and a negative power lens element with a concave surface oriented towards said middle lens unit; and the lens elements comprising said middle lens unit and said rear lens unit are, in order from the front lens unit, a meniscus lens element having a concave object side surface, a biconvex lens element, and a negative lens element with a concave object side surface and an image side surface, said concave object side surface having a smaller radius of curvature than said image side surface.

14. A zoom lens according to claim 13, wherein said meniscus lens element and said biconvex lens element form said middle lens unit; and said negative lens element with said concave object side surface forms said rear lens unit.

15. A zoom lens according to claim 14, having at least one aspheric surface in each of said lens units.

16. A zoom lens according to claim 15, wherein $f_w<29$ mm and said zoom lens has a maxiumu ½ of view that is at least 30 degrees.

17. A zoom lens according to claim 14, further having an aperture stop which moves integrally with lens elements of said front lens unit.

18. A zoom lens according to claim 17, having at least two aspheric surfaces.

19. A zoom lens according to claim 17, having at least one aspheric surface in each of said lens units.

20. A zoom lens according to claim 17, wherein said zoom lens has only 5 lens elements and $f_w<29$ mm.

* * * * *